United States Patent Office 3,822,318
Patented July 2, 1974

3,822,318
OXIDATION OF ALIPHATIC AND ALICYCLIC HYDROCARBONS
Arthur M. Brownstein, Cherry Hill, N.J., and David L. Kerr, Wilmington, Del., assignors to Sun Research and Development Co., Philadelphia, Pa.
No Drawing. Filed May 1, 1968, Ser. No. 725,944
Int. Cl. C07c 73/06
U.S. Cl. 260—610 B                                            6 Claims

ABSTRACT OF THE DISCLOSURE

Cuprous halide which has been activated by contact with an aromatic heterocyclic amine is an effective catalyst for the oxidation of aliphatic and alicyclic compounds.

BACKGROUND OF THE INVENTION

This invention relates to an improved process for the oxidation of aliphatic and alicyclic hydrocarbons to form the corresponding hydroperoxides, aldehydes, ketones, acids and the like. More particularly, this invention relates to the use of a cuprous halide-amine complex as a catalyst to improve the oxidation rate of aliphatic and alicyclic compounds to form a variety of oxidation products. The terms "aliphatic" and "alicyclic" as used herein, includes both saturated and unsaturated non-aromatic hydrocarbons.

SUMMARY OF THE INVENTION

It has been found, in accordance with the present invention, that the rate of oxidation of aliphatic and alicyclic hydrocarbons to form oxidation products such as the corresponding hydroperoxides, alcohols, aldehydes, ketones, and the like, can be substantially improved when there is employed as the oxidation catalyst a cuprous halide which has been activated with an aromatic heterocyclic amine such as pyridine.

DESCRIPTION OF THE PREFERRED EMBODIMENTS

The cuprous halide-amine catalyst may readily be prepared in accordance with the teachings contained in U.S. Pat. 3,219,625, as, for example, by reacting a cuprous halide with an excess of an aromatic heterocyclic amine such as pyridine, quinoline, isoquinoline, triazine, pyrazine or the like, and thereafter recovering the resultant complex from solution. Alternatively, and more preferably, the catalyst may be prepared *in situ* by adding a slight excess of amine to the cuprous halide in the reaction medium. The cuprous halide may be cuprous halide may be cuprous bromide or iodide, but is preferably cuprous chloride.

While the weight ratio of cuprous halide to heterocyclic amine is not critical, it is desirable that the catalyst contains from about 1 to 100 parts by weight of cuprous halide for each 100 parts of amine, and preferably from 5 to 30 by weight of cuprous halide, in order to provide optimum effectiveness.

The starting materials employed in the process of this invention comprise both aliphatic and alicyclic hydrocarbons. By this it is meant that the aliphatic compounds include both paraffinic and aliphatic olefinic hydrocarbons, having from three to sixteen carbon atoms such as propylene, isobutane, isobutylene, 1-butene, and hexadecane, while the alicyclic compounds include both saturated ring compounds and non-aromatic unsaturated ring compounds having from five to seven carbon atoms, such as cyclohexane, cyclohexene, cyclopentane, cycloheptane, as well as Decalin. These compounds may be substituted by those groups which would not be oxidized by the conditions of this process, as for example nitro, nitrile, sulfone, and carboxylic acid radicals.

Generally speaking, whether the starting materials are open chain or cyclic compounds, it is important to note that in the saturated compounds the secondary and/or tertiary carbon atoms are readily oxidized by this process, while in the unsaturated hydrocarbons those carbon atoms which are γ to a double bond, whether they be primary, secondary, or tertiary, will be readily oxidized.

The nature of the products obtained will be determined by the reaction conditions employed, and particularly the temperature. Thus, within the given temperature range discussed below, the lower the temperature, generally speaking, the greater the amount of hydroperoxide which will be formed as the principal product. As the temperature is increased, it is found that the oxidation of primary carbon atoms leads principally to the production of aldehydes and acids; the oxidation of secondary carbon atoms leads principally to the production of ketones and alcohols; while the oxidation of tertiary carbon atoms generally results either in the decomposition of the hydroperoxide to form an alcohol, or in chain scission to give a ketone and an alcohol as the principal products.

Together with the particular temperature employed, the final product will also be a function of the nature of the starting material. Thus, for example, the oxidation of isobutane in accordance with this process at 110° C. will provide the corresponding hydroperoxide, while the same oxidation carried out at 145° C. will result in acetone and methyl alcohol as the principal products. From the foregoing, those skilled in the art will perceive that by the proper selection of starting material and reaction conditions within the teaching of this invention, a wide variety of oxidized organic compounds may thereby be obtained.

The process of this invention, utilizing the aforedescribed catalyst, is conveniently carried out by the rapid passage of oxygen or air through a suitable reactor, to which has first been added a mixture of the hydrocarbon substrate, the cuprous halide-heterocyclic amine catalyst, and solvent where needed. The air or oxygen should be brought into intimate contact with the liquid phase, for example, by the use of high speed stirrers, suitable nozzles or the like.

The amount of catalyst employed will vary depending upon the nature and amount of material to be oxidized. In general, however, the amount of catalyst may vary from about 0.05 grams to 2.0 grams of catalyst per mole of substrate, and preferably should be from 0.1 to 1.0 grams per mole of substrate.

The rate of input of oxygen or air will depend upon the temperature and pressure utilized during the oxidation. There should be provided at least an amount theoretically sufficient to convert the starting material completely to the corresponding oxidation product and preferably an excess of this amount. It has been found that a flow rate ranging from 0.5 to 300 liters per hour is generally sufficient for most conversions. Any uncombined oxygen may, of course, be recycled to the reactor. The reaction may be effected at normal or superatmospheric pressure.

The reaction temperature may range from about 25–200° C. but is preferably in the range of from 60–150° C. In those instances where the reaction temperature exceeds the boiling point of the aliphatic or alicyclic hydrocarbon substrate, it is desirable to conduct the oxidation under superatmospheric pressure. Also, if the hydrocarbon substrate is not a liquid under the conditions of the oxidation, it is desirable to employ a suitable solvent for the process. The solvent, when employed, should be liquid and inert under the oxidation conditions of the process.

Suitable solvents may be selected from chlorinated and nitrated aromatic compounds, e.g., nitrobenzene, chlorobenzene, and o-dichlorobenzene and the like.

The reaction is generally complete in from one to ten hours, depending upon the amount of substrate employed. However, the reaction can be terminated after a period of two to three hours and the products recovered.

Advantageously, small amounts of a hydroperoxide may be introduced into the reaction medium to act as a reaction initiator. Thus, for example, when cyclohexane is being oxidized, it has been found to be advantageous to add a small amount of cumyl hydroperoxide in order to initiate the reaction.

The resulting products are readily recovered from the reaction medium by conventional methods. Thus, for example, in the oxidation of propylene, acrylic acid may be conveniently recovered by extracting the reaction mixture with aqueous alkali, acidifying the extract and distilling the free acid from the reaction mixture.

The above-described invention provides a method for the preparation of unsaturated acids, alcohols, aldehydes and the like in higher yields than have heretofore been obtained. In addition, compounds, such as ketones and hydroperoxides can be obtained under milder conditions than previously possible for similar yields.

EXAMPLE 1

A 50 ml. resin pot is immersed in a thermostated oil bath (75° C.). The pot is fitted with a hollow stirrer shaft through which oxygen can be added and dispersed through the agitated system. The apparatus is otherwise fitted with a water-cooled reflux condenser and vented to the atmosphere through a mineral oil or mercury bubbler. Oxygen pressure is maintained at about 1 atmosphere by a rapid flow-through of 60 mls./min.

Cyclohexane (200 mmoles) is charged with cumene hydroperoxide (1 mole percent) as a promoter and 0.25 weight percent (ca. 0.1 mmoles) cuprous chloride in suspension. Pyridine (57 mg.) is added to the agitated system (ca. 450 r.p.m.) after all other reagents are present. Cyclohexanone and cyclohexanol are obtained as products. These products are readily separated and recovered by fractional distillation of the reaction mixture.

EXAMPLE 2

The procedure of Example 1 is repeated employing cyclohexene in place of cyclohexane. Cyclohexene-3-hydroperoxide is obtained in 3 hours in high yield.

EXAMPLE 3

Chlorobenzene (50 mls.) is charged to a stainless steel autoclave fitted with a mechanical stirrer, along with cuprous bromide (60 mg.), and pyridine (57 mg.). The system is heated to 110° C., agitated and pressurized first with propylene to 300 p.s.i.g., and finally with oxygen for a total final pressure of 600 p.s.i.g. Oxygen is continually fed to the mixture to maintain the pressure at 600 p.s.i.g. After 2 hours, acrylic acid and acrolein are obtained in good yield.

EXAMPLE 4 o-Dichlorobenzene (50 mls.) is charged to a stainless steel autoclave as in Example 3. The system is then charged with cuprous chloride (60 mg.), and quinoline (25 mg.) and cumene hydroperoxide (0.3 g.). The mixture is agitated, heated to 100° C. and pressurized with isobutane to 400 p.s.i.g. It is then pressurized with oxygen to 700 p.s.i.g. Additional oxygen is fed to the mixture over a 3 hour period to maintain the pressure at 700 p.s.i.g. T-butyl hydroperoxide is formed in excellent yield as measured by $Na_2S_2O_3$—KI titration.

EXAMPLE 5

The procedure of Example 1 is repeated at 130° C. using Decalin in place of cyclohexane and pyrazine in place of pyridine; 1-decalone is obtained in good yield after 2 hours.

What is claimed is:

1. A process for the production of aliphatic or alicyclic hydroperoxides which comprises contacting a compound selected from the group consisting of paraffinic or aliphatic mono-olefinic hydrocarbons having from 3 to 16 carbon atoms, saturated or mono-unsaturated monocyclic hydrocarbons having from 5 to 7 carbon atoms, and Decalin with oxygen at a temperature in the range of about 25 to 200° C. in the presence of a catalyst consisting of cuprous chloride or cuprous bromide and an aromatic heterocyclic amine selected from the group consisting of pyridine, quinoline, pyrazine, triazine, and isoquinoline, wherein the weight ratio of aromatic heterocyclic amine to cuprous chloride or cuprous bromide is between about 0.7:1 and 2:1.

2. The process according to claim 1 wherein the temperature is in the range of from 60 to 150° C.

3. The process according to claim 1 wherein the reaction is carried out in the presence of an added hydroperoxide.

4. The process according to claim 1 wherein the reaction is carried out in the presence of an inert solvent.

5. The process according to claim 1 wherein the aliphatic hydrocarbon is isobutane.

6. The process according to claim 1 wherein the alicyclic hydrocarbon is cyclohexene.

References Cited

UNITED STATES PATENTS

| | | | |
|---|---|---|---|
| 2,792,424 | 5/1957 | Weesner | 260—610 |
| 2,792,425 | 5/1957 | Weesner | 260—610 |
| 2,792,426 | 5/1957 | Weesner | 260—610 |
| 3,219,625 | 11/1965 | Blanchard et al. | 260—396 |
| 2,570,487 | 10/1951 | Ross et al. | 260—610 B |
| 2,734,086 | 2/1956 | Goppell et al. | 260—610 B |
| 3,392,200 | 7/1968 | Vrbaski | 260—597 R |
| 3,467,720 | 9/1969 | List et al. | 260—610 B |

FOREIGN PATENTS

| | | | |
|---|---|---|---|
| 1,135,880 | 10/1962 | Germany | 260—533 |
| 6410417 | 3/1966 | Netherlands | 260—604 |

BERNARD HELFIN, Primary Examiner

W. B. LONE, Assistant Examiner

U.S. Cl. X.R.

260—533 R, 586 B, 597 R, 604 R, 598, 617 H, 514 R